United States Patent
Shin et al.

(10) Patent No.: US 11,558,625 B2
(45) Date of Patent: Jan. 17, 2023

(54) METHOD FOR GENERATING RESIDUAL IMAGE OF MULTI-VIEW VIDEO AND APPARATUS USING THE SAME

(71) Applicant: ELECTRONICS AND TELECOMMUNICATIONS RESEARCH INSTITUTE, Daejeon (KR)

(72) Inventors: Hong-Chang Shin, Daejeon (KR); Gwang-Soon Lee, Daejeon (KR); Ho-Min Eum, Daejeon (KR); Jun-Young Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/356,088

(22) Filed: Jun. 23, 2021

(65) Prior Publication Data

US 2021/0409726 A1    Dec. 30, 2021

(30) Foreign Application Priority Data

Jun. 24, 2020 (KR) .......................... 10-2020-0077399
Sep. 29, 2020 (KR) .......................... 10-2020-0127279
Jan. 7, 2021 (KR) .......................... 10-2021-0001953
May 10, 2021 (KR) .......................... 10-2021-0060227

(51) Int. Cl.
H04N 19/186 (2014.01)
H04N 19/157 (2014.01)
G06F 16/901 (2019.01)

(52) U.S. Cl.
CPC ....... H04N 19/157 (2014.11); G06F 16/9024 (2019.01); H04N 19/186 (2014.11)

(58) Field of Classification Search
CPC .... H04N 13/00; H04N 19/157; H04N 19/186; G06F 16/9024; G06F 16/738
See application file for complete search history.

(56) References Cited

U.S. PATENT DOCUMENTS

| | | | | |
|---|---|---|---|---|
| 10,230,962 | B2 * | 3/2019 | Kim | ..................... H04N 19/159 |
| 2017/0310977 | A1 * | 10/2017 | Laroche | ............... H04N 19/176 |
| 2018/0084258 | A1 * | 3/2018 | Kim | ..................... H04N 19/186 |
| 2018/0359487 | A1 | 12/2018 | Bang et al. | |
| 2021/0006834 | A1 * | 1/2021 | Salahieh | ................ H04N 19/59 |
| 2022/0006996 | A1 * | 1/2022 | Boissonade | .......... H04N 13/122 |

OTHER PUBLICATIONS

Hyun-Ho Kim et al., "Standard Technology for MPEG-I 3DOF+ Video coding" Telecommunications Technology Association (TTA) Journal, Special Report, Sep. 2019, pp. 17-25, vol. 185.

"Test Model 5 for Immersive Video," International Organisation for Standardisation Organisation Internationale De Normalisation, ISO/IEC JTC 1/SC 29/WG 11 N 19213, Coding of Moving Pictures and Audio, Date of document: May 16, 2020, pp. 1-35.

* cited by examiner

*Primary Examiner* — Tsion B Owens

(57) ABSTRACT

Disclosed herein are a method and apparatus for generating a residual image of multi-view video. The method includes generating a pruning mask of an additional view image by mapping a basic view image to the additional view image, among multi-view images, and detecting outliers in the pruning mask using color information of the basic view image and the additional view image.

18 Claims, 14 Drawing Sheets

METHOD FOR GENERATING RESIDUAL IMAGE OF MULTI-VIEW VIDEO AND APPARATUS USING THE SAME

CROSS REFERENCE TO RELATED APPLICATIONS

This application claims the benefit of Korean Patent Application No. 10-2020-0077399, filed Jun. 24, 2020, No. 10-2020-0127279, filed Sep. 29, 2020, No. 10-2021-0001953, filed Jan. 7, 2021, and No. 10-2021-0060227, filed May 10, 2021, which are hereby incorporated by reference in their entireties into this application.

BACKGROUND OF THE INVENTION

1. Technical Field

The present invention relates to an image synthesis technique that uses residual images, from which overlapping areas between reference view images are removed, for respective views when an immersive media service is provided using multiple reference view images, thereby supporting an omnidirectional view while efficiently managing image data.

2. Description of the Related Art

These days, in order to provide an immersive video service, standardization of a pruning technique, which is configured to detect overlapping areas between multiple view images and remove the same in order to efficiently manage data when an arbitrary virtual view image is synthesized using multi-view video, and of metadata, which is required for rendering technology that is used when a decoder reconstructs high-quality video by receiving the data, are underway in MPEG-I.

Hereinafter, a conventional method for reducing redundant image data based on overlapping pixels will be described with reference to FIGS. 1 to 3.

FIG. 1 is a view illustrating video, the scenes of which are captured using multiple cameras having different viewpoints.

Referring to FIG. 1, reference numeral 104 denotes a center1 view image, and reference numerals 102 and 105 denote a left1 view image and a right1 view image, respectively. Reference numeral 103 denotes a view image acquired when a virtual view image from a view position located between the view positions of the left1 view image 102 and the center1 view image 104 is generated using reference views. In the virtual view image 103, an occluded area 106, which is not shown in the center1 view image 104, appears. Here, because a portion of this occluded area 106 is shown in the left1 view image 102, the portion may be referred to when the image is synthesized.

FIG. 2 is a view illustrating an existing method of reducing overlapping image data between a basic view image and reference view images, other than the basic view image, when the viewpoint corresponding to the basic view image is at the center.

Referring to FIG. 2, based on the basic view image 203, the remaining view images are reference view images 201, 202 and 204. First, after the process of 3D view warping of the basic view image 203 to the reference view images 201, 202 and 204 using the 3D geometric relationship therebetween and a depth map, the basic view image 203 is mapped to the positions of the respective view images, whereby warped images 211 and 212 are generated, as shown in the drawing.

Here, areas that are not shown in the basic view image 203 are generated in the warped images 211 and 212 as holes, in which data corresponding thereto is not present, and these holes appear as black areas 213 and 214 in the warped images 211 and 212. The remaining area, excluding the holes, is shown in the basic view image 203, and the process of checking whether the remaining area is an overlapping area between a set of the additional view images 201 and 202 and a set of the warped view images 211 and 212 is performed, after which the overlapping area may be removed.

Here, as the method of removing the overlapping area, the process of comparing texture data and depth information between image pixels located at the same coordinates or mapped in a fixed range from the coordinates and determining the overlapping area based thereon is performed.

When the area determined to be redundant between views is removed through such a process, residual images 221 and 222 corresponding to the respective reference views are generated. Here, the residual image indicates an image including only the area that is not visible in the basic view image but is visible in the reference view image.

FIG. 3 is a view illustrating a pruning technique employed for a test model, the standardization of which is underway in the MPEG-I visual group.

Referring to FIG. 3, first, among multiple view images, one or more basic view images are designated as a root node. The remaining images are additional view images, and are designated as parent nodes and child nodes based on a preset pruning order, thereby forming a pruning graph. The root node has the highest priority, a node above each node is called the parent node thereof, and a node beneath each node is called the child node thereof.

When a pruning graph is generated, all pixels in the basic view image at the root node are projected to the position(s) of the view image(s) at the child node(s) that is (are) connected thereto in the graph through a 3D view warping process. All of the additional view images have own pruning mask, and whether to remove (prune) or preserve a pixel overlapping the projected pixel of the view image at the parent node is determined. When the pixel and the projected pixel are determined to be the same point, the pixel is removed, in which case only depth information is used for the determination.

If only depth values are referred to in order to determine whether two pixels are corresponding points, when the depth values contain an error, one of the pixels may be removed even though the pixels are different from each other. When a pixel that is not redundant is removed because it is erroneously determined to be a corresponding point, a decoder acquires no information about the corresponding pixel, which causes a quality degradation problem when rendering is performed. Accordingly, it is urgently required to validate a correspondence relationship using other types of information in order to determine corresponding points in a pruning mask. In connection with this, U.S. Patent Application Publication No. 2018-035948 discloses a technology related to "Multi-viewpoint video encoding/decoding method".

SUMMARY OF THE INVENTION

An object of the disclosed embodiment is to provide a method for efficiently processing image data, the size of which increases with the increasing number of reference view images, when multiple reference view images are used.

Another object of the disclosed embodiment is to improve the reliability of pruning using not only depth values but also color information in a pruning process for removing an overlapping area between reference view images.

A method for generating a residual image of multiple-view video according to an embodiment may include generating a pruning mask of an additional view image by mapping a basic view image to the additional view image, among multi-view images, and revalidating the pruning mask using color information of the basic view image and the additional view image.

Revalidating the pruning mask may include defining a color relationship between the basic view image and the additional view image by extracting corresponding pixels of the basic view image and the additional view image, which correspond to pruning candidates of the pruning mask, and detecting pixels that do not match the color relationship, among pixels of the pruning mask, as outliers.

Generating the pruning mask may include generating a pruning graph based on information about relationships between the multi-view images.

The method may further include generating patches based on the pruning mask in which the outliers are updated to be preserved.

The method for generating a residual image of multi-view video according to an embodiment may further include packing the patches in units of atlases.

The method for generating a residual image of multi-view video according to an embodiment may define the color relationship using a least square method for the corresponding pixels.

The color relationship is defined using all pixels corresponding to the pruning candidates of the pruning mask.

Defining the color relationship may be performed only for images having a direct relation therebetween in the pruning graph.

A color relationship between images having an indirect relation therebetween may be estimated using the color relationship between the images having the direct relation therebetween.

Defining the color relationship may be configured to define a representative color relationship between the basic view image and the additional view image at regular intervals.

An apparatus for generating a residual image of multiple-view video according to an embodiment may include a first pruning unit for generating a pruning mask of an additional view image by mapping a basic view image to the additional view image, among multi-view images, and a second pruning unit for revalidating the pruning mask using color information of the basic view image and the additional view image.

The second pruning unit may define a color relationship between the basic view image and the additional view image by extracting corresponding pixels of the basic view image and the additional view image, which correspond to pruning candidates of the pruning mask, and may detect pixels that do not match the color relationship, among pixels of the pruning mask, as outliers.

The first pruning unit may generate a pruning graph based on information about relationships between the multi-view images.

The apparatus for generating a residual image of multi-view video according to an embodiment may further include a patch generation unit for generating patches based on the pruning mask in which the outliers are updated to be preserved.

The apparatus for generating a residual image of multi-view video according to an embodiment may further include a packing unit for packing the patches in units of atlases.

Here, the color relationship may be defined using a least square method for the corresponding pixels.

The second pruning unit may define the color relationship using all pixels corresponding to the pruning candidates of the pruning mask.

The second pruning unit may define a color relationship only between images having a direct relation therebetween in the pruning graph.

A color relationship between images having an indirect relation therebetween may be estimated using the color relationship between the images having the direct relation therebetween.

The second pruning unit may define a representative color relationship between the basic view image and the additional view image at regular intervals.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
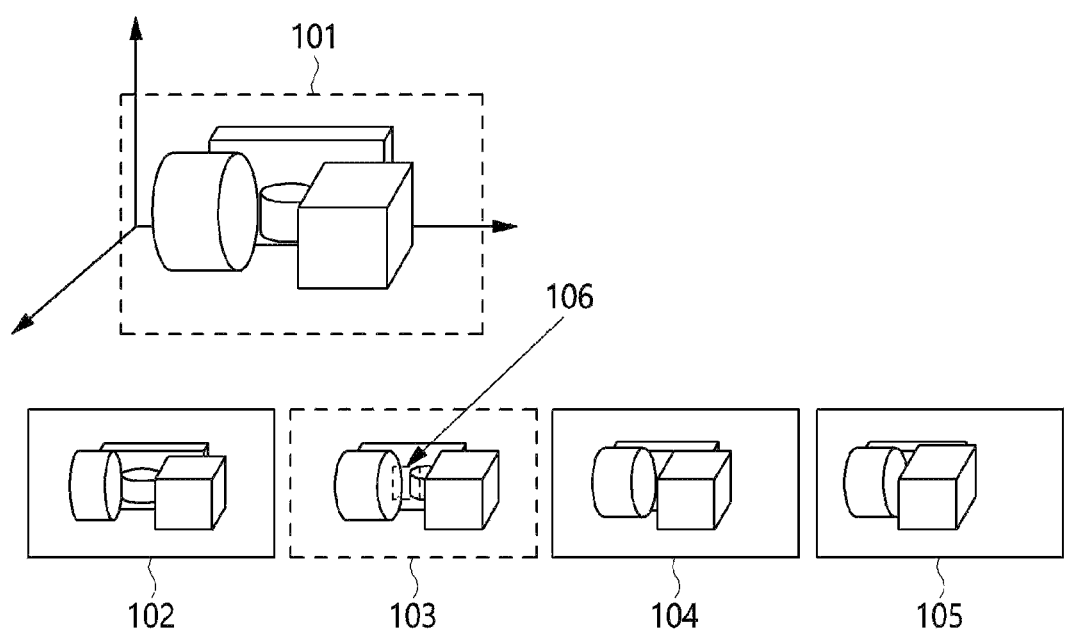
FIG. 1 is a view illustrating video, scenes of which are captured using multiple cameras having different viewpoints.
Figure 2:
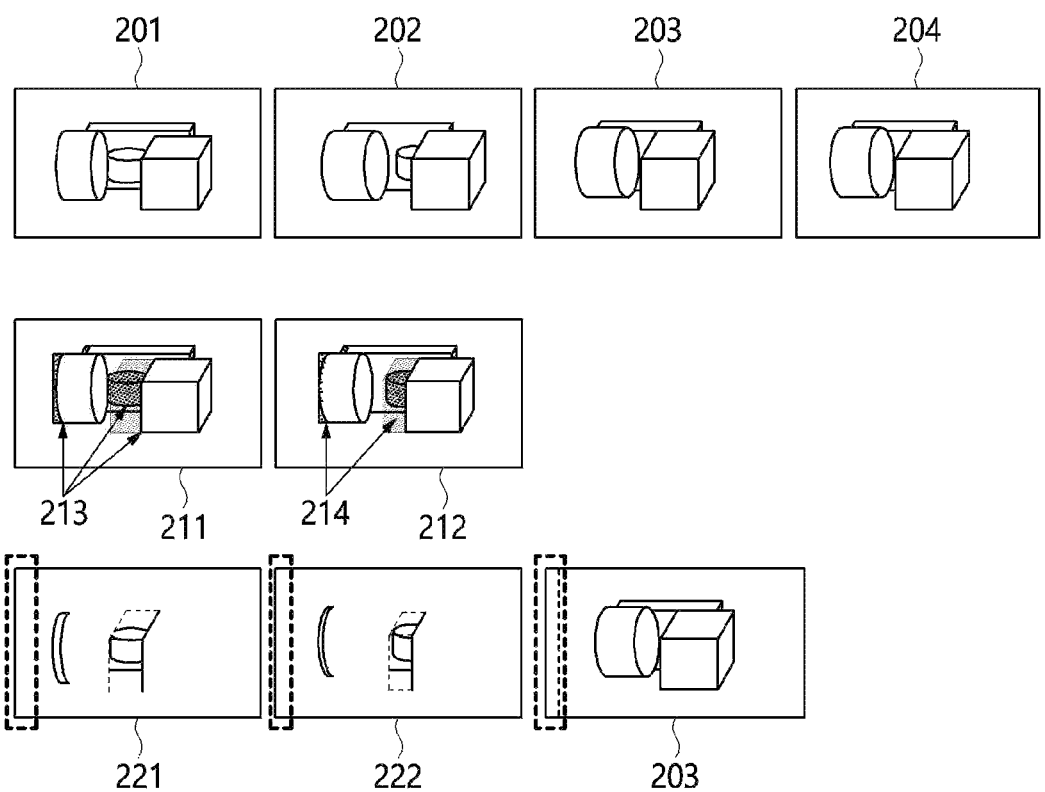
FIG. 2 is a view illustrating a method for reducing redundant image data between a basic view image and a reference view image different therefrom.
Figure 3:
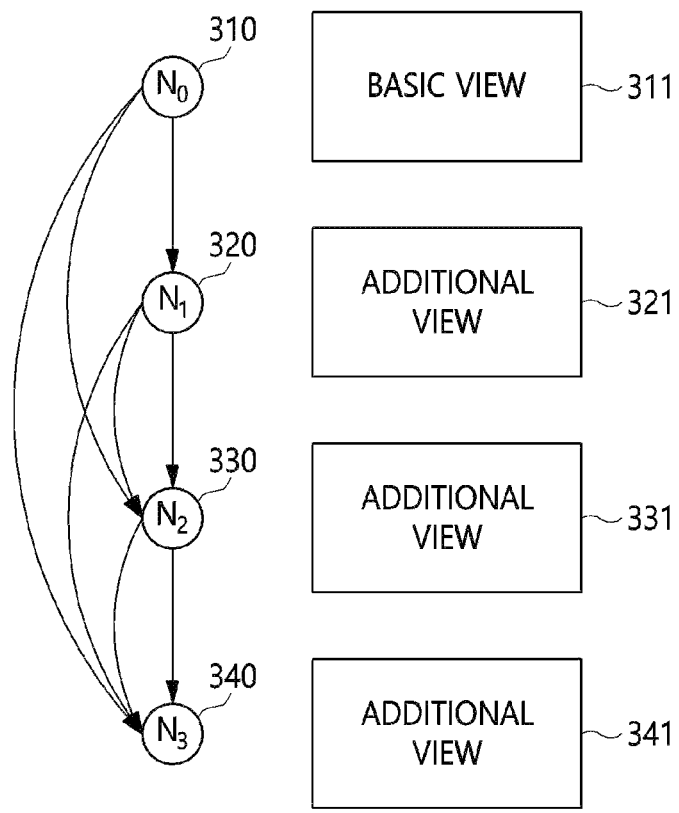
FIG. 3 is a view illustrating a pruning technique employed for a test model, the standardization of which is underway in the MPEG-I visual group.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, a method and apparatus for generating a residual image of multi-view video according to an embodiment will be described in detail with reference to FIGS. 4 to 13.

Figure 4A:
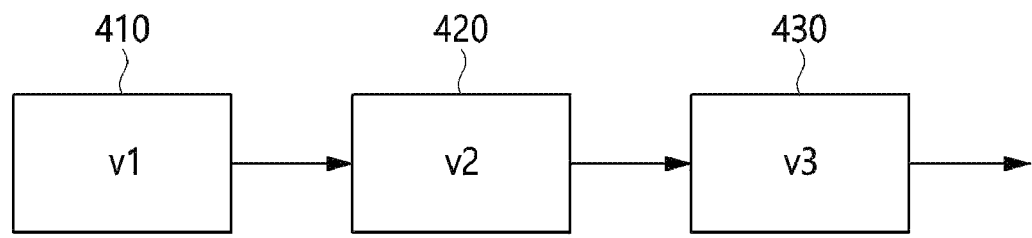
FIGS. 4A and 4B are views illustrating a pruning technique for removing overlapping pixels between two view images.
Figure 4B:
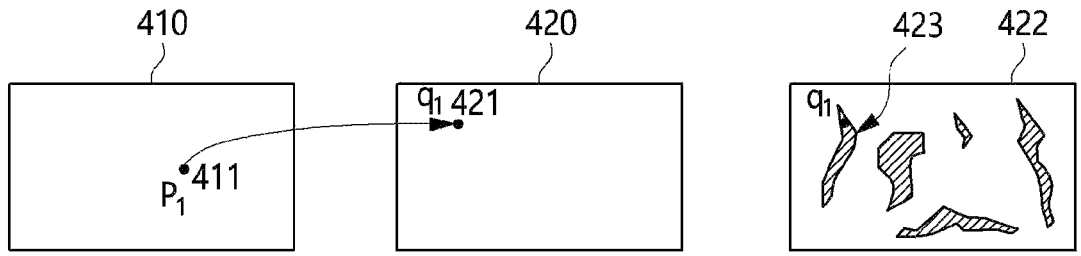

FIGS. 4A and 4B are views illustrating a pruning technique for removing overlapping pixels between two view images.

Referring to FIGS. 4A and 4B, it can be seen that a first view image 410 is assigned a higher priority than a second view image 420 according to a pruning order. Accordingly, a pixel determined to be the correspondence between the first view image 410 and the second view image 420 is preserved in the first view image 410 but is removed from the second view image 420.

The method of determining a correspondence relationship is configured such that the depth value of $D(p_1)$ of a first pixel 411 in the first view image 410 is compared with the depth value $D(q_1)$ of a second pixel 421 in the second view image 420, to which the first pixel 411 is mapped through 3D view warping of the first view image 410 to the second view image 420 using the depth value $D(p_1)$ of the first pixel 411. When the difference between the depth values of the two pixels is equal to or less than a threshold value, the two pixels are determined to have a correspondence relationship. When the two pixels are determined to have a correspondence relationship therebetween, the second pixel 421 is the pixel to be removed from the second view image 420, and is marked in the pruning mask 422 of the second view image 420.

Here, because the correspondence relationship is determined by comparing only the depth values, when the depth values contain an error, the two pixels may be erroneously determined to have a correspondence relationship even though the two pixels are different, and one of them may be removed.

Reference numeral 422 denotes a mask image in which the pixels to be removed from the second view image 420 through first pruning using depth information are marked. The pixels marked with diagonal lines in the mask image 422 are a group of candidates for the pixels to be removed because they are determined to be overlapping pixels through the first pruning process.

Here, a pixel that is erroneously determined to be an overlapping pixel due to factors such as incorrect depth information or the like may be included in the candidate group. When a pixel is erroneously determined to be an overlapping pixel and removed although the pixel is not an overlapping pixel, quality degradation may occur when the corresponding view image is reconstructed by a decoder.

The present invention proposes a method for detecting outliers through post-processing of pixels that are erroneously determined to be overlapping pixels in the pruning candidate group of the mask image 422. The criteria for determining an outlier are described below.

When the first pixel 411 and the second pixel 421 in FIG. 4B are assumed to be correctly corresponding points, color components corresponding to the textures of the two points must be identical to each other under ideal conditions because they correspond to the same point in the same scene projected to different view images. However, the intensity of the color components may be changed by variation in illumination depending on a view position, the method of acquiring a view image using a camera, image noise, or the like. Therefore, the textures of the two points, which are correctly corresponding points, may have similar values within a certain range, rather than being the same as each other.

The dominant color difference between the two view images 410 and 420, which is caused due to the different environments in which the two respective view images are acquired, may be defined as a color relationship by extracting corresponding points between the two view images 410 and 420 as samples.

Here, the color relationship may correspond to a specific function f as shown in Equation (1) below:

$$p_1 = f(q_1) \qquad (1)$$

When the color difference or color compensation relationship between corresponding points of the two view images 410 and 420 is defined using a specific function f, a point that does not converge to the function f, among the points in the pruning candidate group of the mask image 422, may be determined to be an outlier, rather than a corresponding point.

Here, parameters for the function may be stored as metadata.

Here, the function f may be a linear or nonlinear equation, or may be defined as a deep-learning-based deep network in the form of a matrix, which is configured with multiple layers based on a neural network.

Figure 5:
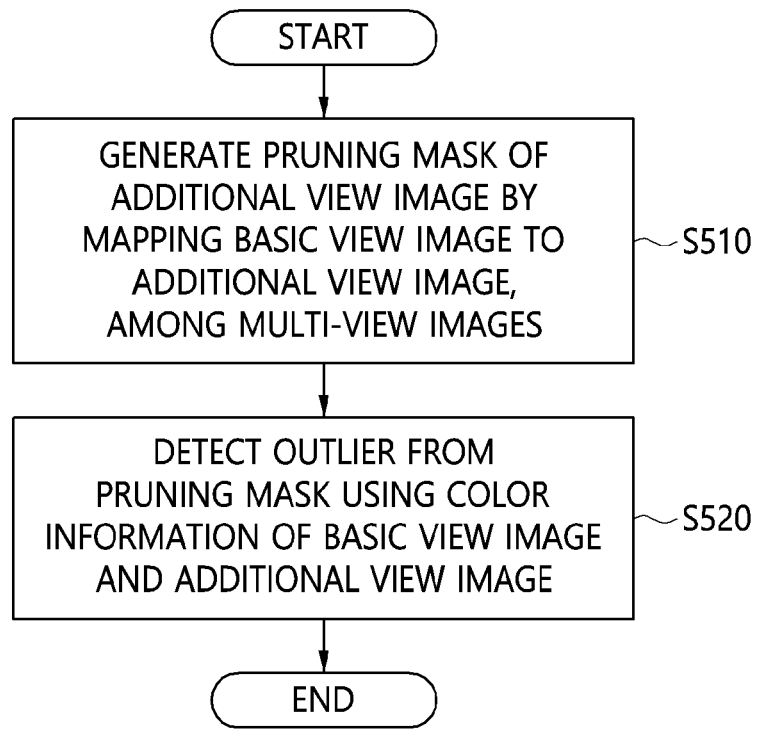
FIG. 5 is a flowchart illustrating a method for generating a residual image of multi-view video according to an embodiment.

FIG. 5 is a flowchart illustrating a method for generating a residual image of multi-view video according to an embodiment.

First, a pruning mask of an additional view image is generated at step S510 by mapping a basic view image to the additional view image, among multi-view images.

Here, a method for mapping a basic view image to the additional view image may correspond to forward mapping or backward mapping.

Here, the process of mapping the basic view image to the additional view image may be the process of 3D view warping of the basic view image to respective reference view images using a 3D geometric relationship and a depth map.

Subsequently, an outlier in the pruning mask is detected using color information of the basic view image and the additional view image at step S520.

Here, generating the pruning mask at step S510 may include generating a pruning graph based on information about the relationships between the multi-view images.

Here, the method of generating a residual image of multi-view video according to an embodiment of the present invention may further include generating patches based on the pruning mask in which the outlier is updated to be preserved (not illustrated).

Also, the method may further include packing the patches in units of atlases (not illustrated).

Figure 6:
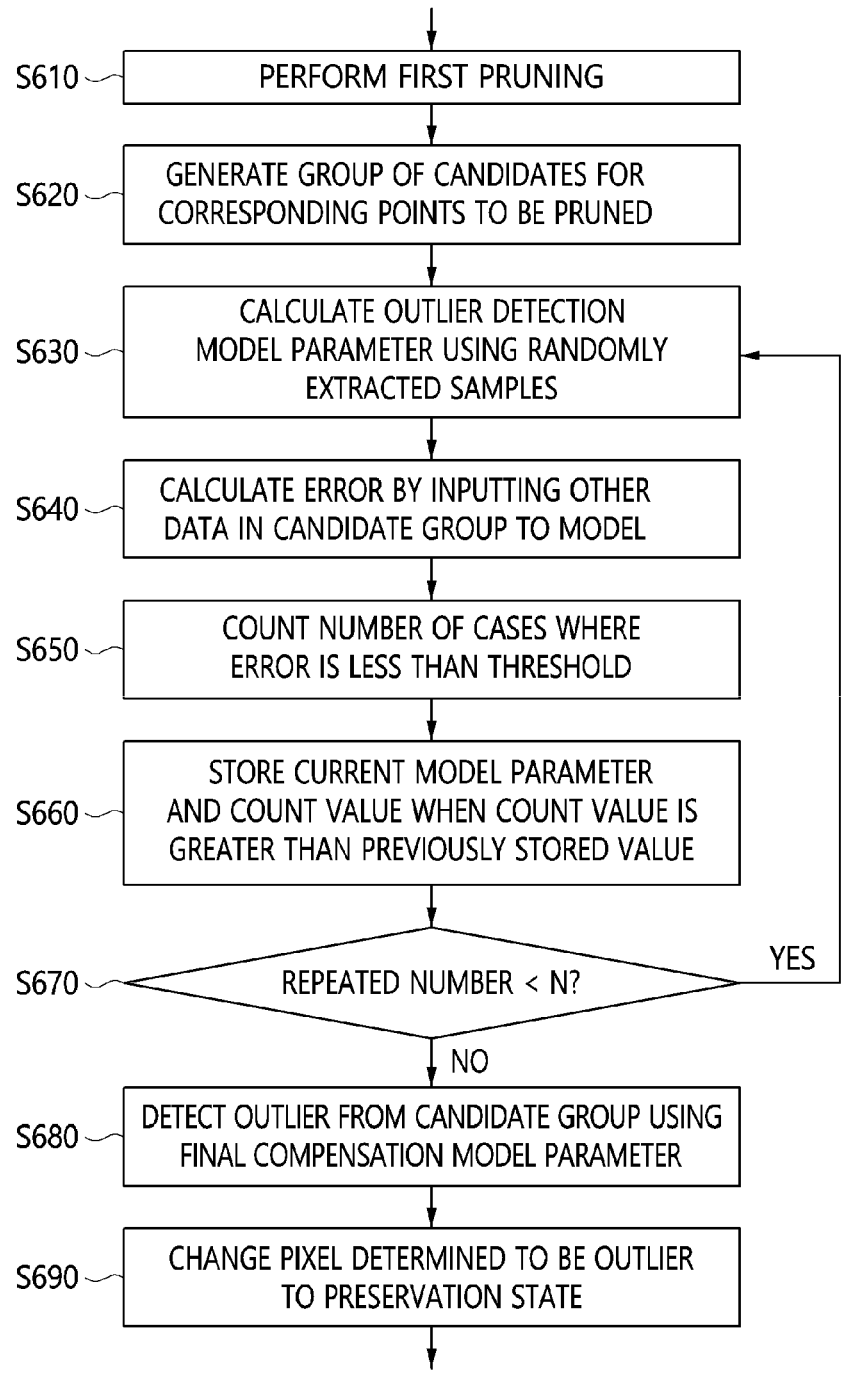
FIG. 6 is a flowchart illustrating in detail a method for generating a residual image of multi-view video according to an embodiment.

FIG. 6 is a flowchart illustrating in detail a method for generating a residual image of multi-view video according to an embodiment of the present invention.

Referring to FIG. 6, first pruning is performed at step S610 by mapping pixels of a basic view image to those of additional view images.

Using a mask image, a pruning candidate group is generated at step S620 from candidates for corresponding points, which are first determined to be corresponding points as the result of first pruning performed in consideration of depth information.

When the candidate group is generated, a number of corresponding points equal to or greater than the minimum number are randomly extracted as samples, and the parameters of a model function f are estimated at step S630.

The minimum number may be defined to satisfy the degrees of freedom which is necessary to estimate the model function f.

Errors are calculated at step S640 by inputting other corresponding points in the candidate group to the estimated model function f, and the number of corresponding points satisfying the case where the error is less than a predefined threshold is counted and recorded at step S650.

When the count value is greater than a previously stored value (or initial value), that is, when the number of corresponding points, the error of which is less than the threshold, is greater than the previously stored value, the current model parameters and the count value are stored at step S660.

This process is performed a predefined number of times N, whereby the process of repeatedly updating and thereby optimizing the parameter values of the model function f is performed at step S670.

When the parameters of the final model function f are calculated, all of the candidates for the corresponding points are calculated again using the parameters, whereby outliers are detected at step S680.

Here, the corresponding points classified as outliers are excluded from the pruning candidate group and regarded as pixels that are not overlapping because it is determined based on the previously calculated model function f that they do not have a correspondence relationship, and thus the pixels are changed to a preservation state at step S690. The pixels changed to the preservation state in the mask image 422 are retained, rather than being removed. Then, the process of generating patches and packing the same may be performed for the pruning mask in which the outliers are updated to be preserved (not illustrated).

In the above process, in order to estimate the function f, texture information of the corresponding points is compared between a parent node and child nodes subordinate thereto in the pruning graph.

As an embodiment for estimating another model function f, a target virtual view image from an arbitrary location in a renderable scene may be synthesized as the original view image that is not pruned. Then, the previously generated target virtual view image is compared with an image acquired through 3D view warping of the first pruned image to the same location as the location of the target virtual view image, whereby texture information determined to overlap may be compared. Here, the target view image may be a reference view image as well as the view image from the arbitrary location.

Figure 7:
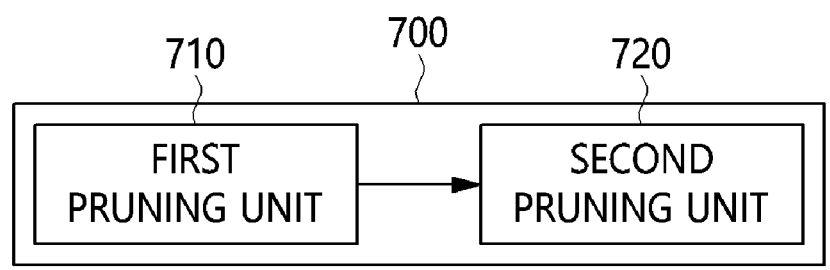
FIG. 7 is a block diagram illustrating an apparatus for generating a residual image of multi-view video according to an embodiment.

FIG. 7 is a block diagram illustrating an apparatus for generating a residual image of multi-view video according to an embodiment.

Referring to FIG. 7, the apparatus 700 for generating a residual image of multi-view video according to an embodiment may include a first pruning unit 710 for generating a pruning mask of an additional view image by mapping a basic view image to the additional view image, among multi-view images, and a second pruning unit 720 for revalidating the pruning mask using color information of the basic view image and the additional view image.

Here, the first pruning unit 710 may generate a pruning graph based on information about the relationships between the multi-view images.

Here, the apparatus for generating a residual image of multi-view video according to an embodiment of the present invention may further include a patch generation unit (not illustrated) for generating patches based on the pruning mask in which outliers are updated to be preserved.

Also, a packing unit (not illustrated) for packing the patches in units of atlases may be further included.

Figure 8:
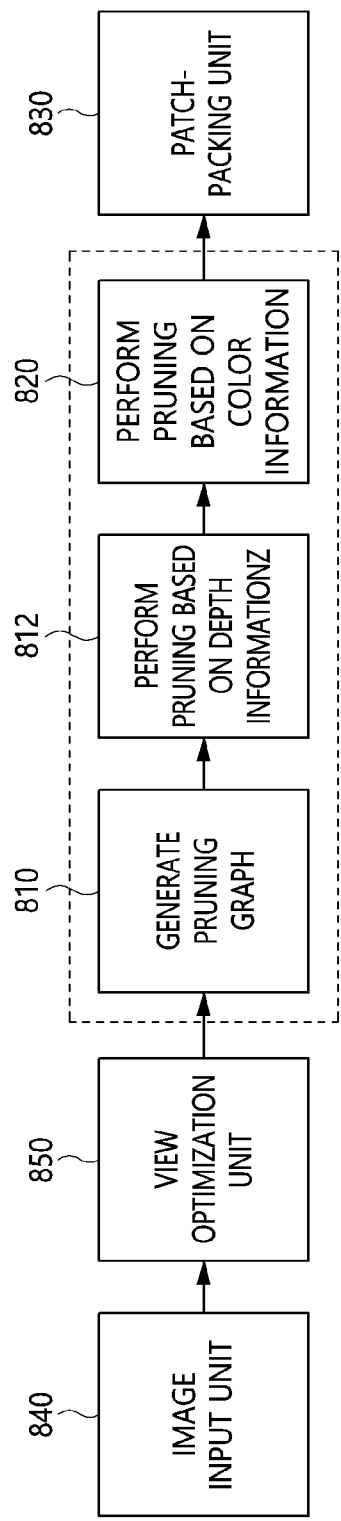
FIG. 8 is a block diagram of an apparatus for generating a residual image of multi-view video according to an embodiment.

FIG. 8 is a block diagram of an apparatus for generating a residual image of multi-view video according to another embodiment.

Referring to FIG. 8, the apparatus for generating a residual image of multi-view video according to an embodiment may perform pruning based on depth information (812) after generating a pruning graph (810), and may perform second pruning (820) using color information after receiving a first pruning result acquired through the depth-information-based pruning process.

Figure 9:
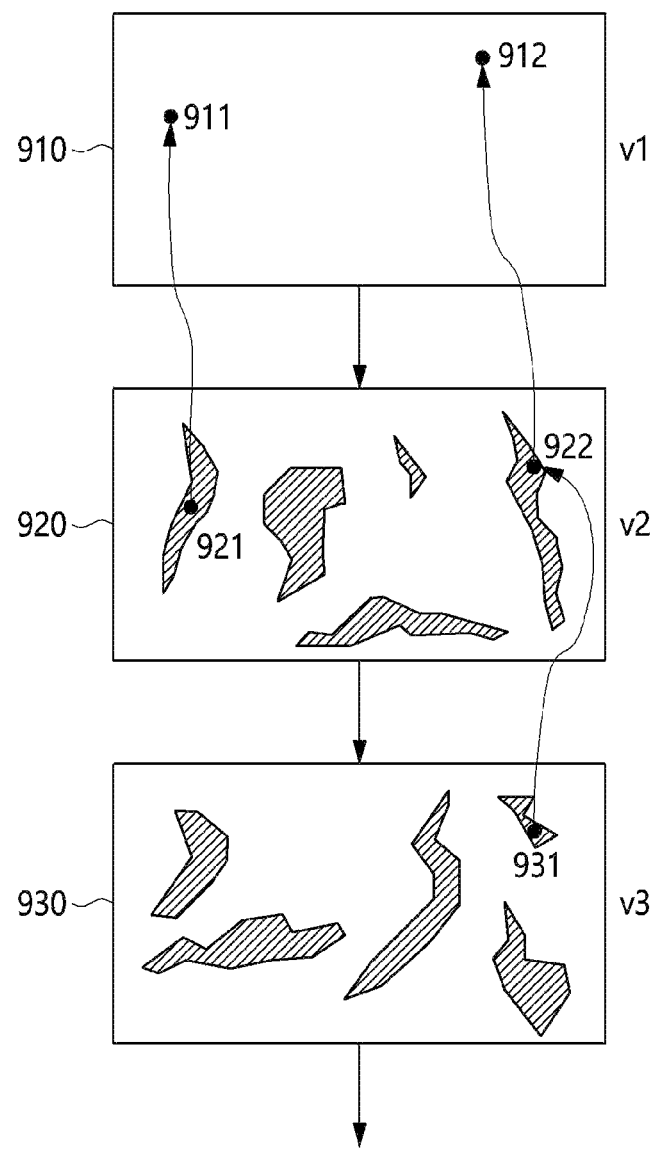
FIG. 9 is a view for explaining a method for using metadata on a function in a decoder unit.

FIG. 9 is a view for explaining a method for using metadata on the function in a decoder unit.

Referring to FIG. 9, it can be seen that subordinate relationships are determined such that a second view image 920 is subordinate to a first view image 910 and a third view image 930 is subordinate to the second view image 920. Because the first view image 910 is a basic view, it is located at a root node, and none of the pixels thereof are removed in a pruning process.

Also, it can be seen that the second view image 920 is the child node of the first view image 910 and that the third view image 930 is the child node of the second view image 920, and a pixel having a corresponding point in any of the ancestor nodes is removed in the pruning process by being regarded as an overlapping pixel (redundancy).

The areas marked with diagonal lines in FIG. 9 represent the areas removed through a pruning process, and the corresponding images are called pruned images 920 and 930.

When overlapping pixels are removed with reference to the relationship represented using the pruning graph, the preserved valid pixels are converted into patches. Also, the patches are packed in units of atlases, and the atlases are transmitted to the decoder unit along with metadata.

Figure 10:
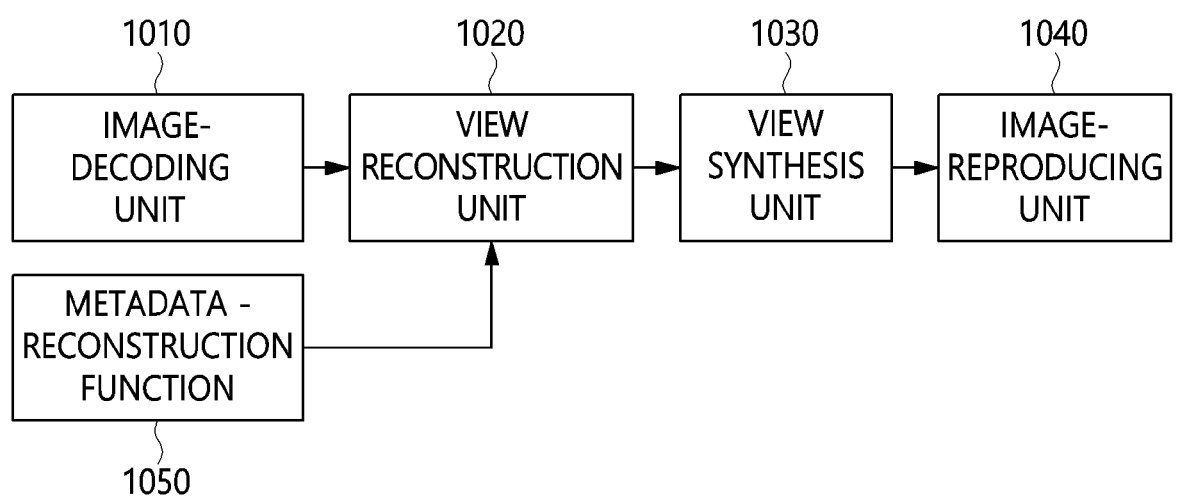
FIG. 10 is a block diagram illustrating a decoder unit of a conventional Test Model for Immersive Video (TMIV)

FIG. 10 is a block diagram illustrating the decoder unit of a conventional Test Model for Immersive Video (TMIV).

The image-decoding unit 1010 of the decoder unit decodes the received atlas, and the view reconstruction unit 1020 thereof reconstructs the patches included in the decoded atlas into a view image before packing (the pruned view image) with reference to metadata 1050 received along with the patches.

The metadata may include camera calibration information, patch reconstruction information, and the like.

The view synthesis unit 1030 reconstructs the original view image from the pruned view image by filling holes in the pruned view image, or synthesizes a target view image through an un-pruning process when a virtual view image at an arbitrary location in the scene is generated. The image-reproducing unit 1040 shows the synthesized image through a display.

The un-pruning process is the process of reconstructing target pixel information by referring to the color and depth values of a corresponding point in a parent node using a backward warping method or the like in order to replace pixels removed from the child nodes through a comparison with the parent node thereof.

For example, because the pixel 921 is removed with reference to the pixel 911 in FIG. 9, the texture information and depth information of the pixel 911 are used, instead of those of the pixel 921. Similarly, pixels 931 and 922 use the texture information and depth information of the pixel 912.

Here, the texture information and depth information of the pixel 921 are removed through a pruning process because the pixel 921 is determined to be the corresponding point of the pixel 911 at the pruning step performed by the encoder unit, but the pixel 921 may not have the same color and the same depth information as the pixel 911. This error may be caused in the pruning process performed by the encoder unit, and the larger the error, the worse the reconstruction quality.

As a method for mitigating the quality degradation at the time of reconstruction, the model equation and parameters derived through Equation (1) above are transmitted as metadata so as to be used as the metadata 1050 for view image reconstruction, which is referred to by the view reconstruction unit 1020 in the block diagram of the conventional TMIV decoder unit illustrated in FIG. 10.

$$q_1' = f^{-1}(p_1) \quad (2)$$

Assuming that the relationship between corresponding points of view images 910 and 920 in FIG. 9 is defined as Equation (1), a relation defined for each subordinate relationship for pruning and parameters of the relation are transmitted as metadata. The decoder unit forms a reconstruction function in the form of an inverse function based on the metadata, as shown in Equation (2), thereby reducing the error resulting from pruning. For example, when the second pixel 921 is assumed to be $q_1$, the value of the first pixel 911 is input to the inverse function, whereby the estimated value $q_1'$ may be reconstructed.

As another embodiment, when the final model parameters are calculated using Equation (1) above, the reliability of pruning may be calculated using a method such as calculating the average of errors in the points classified as inliers when the step (S680) of finally detecting outliers illustrated in FIG. 6 is performed. This pruning reliability is transmitted as metadata, and the decoder unit uses the same as an un-pruning weight when it reconstructs or synthesizes a view image, whereby the quality of image reconstruction or image synthesis may be improved.

In FIG. 6, parameters for an outlier detection model are calculated using samples that are randomly extracted from candidates for corresponding points, which are first determined to be corresponding points as the result of first pruning performed in consideration of depth information.

Figure 11A:
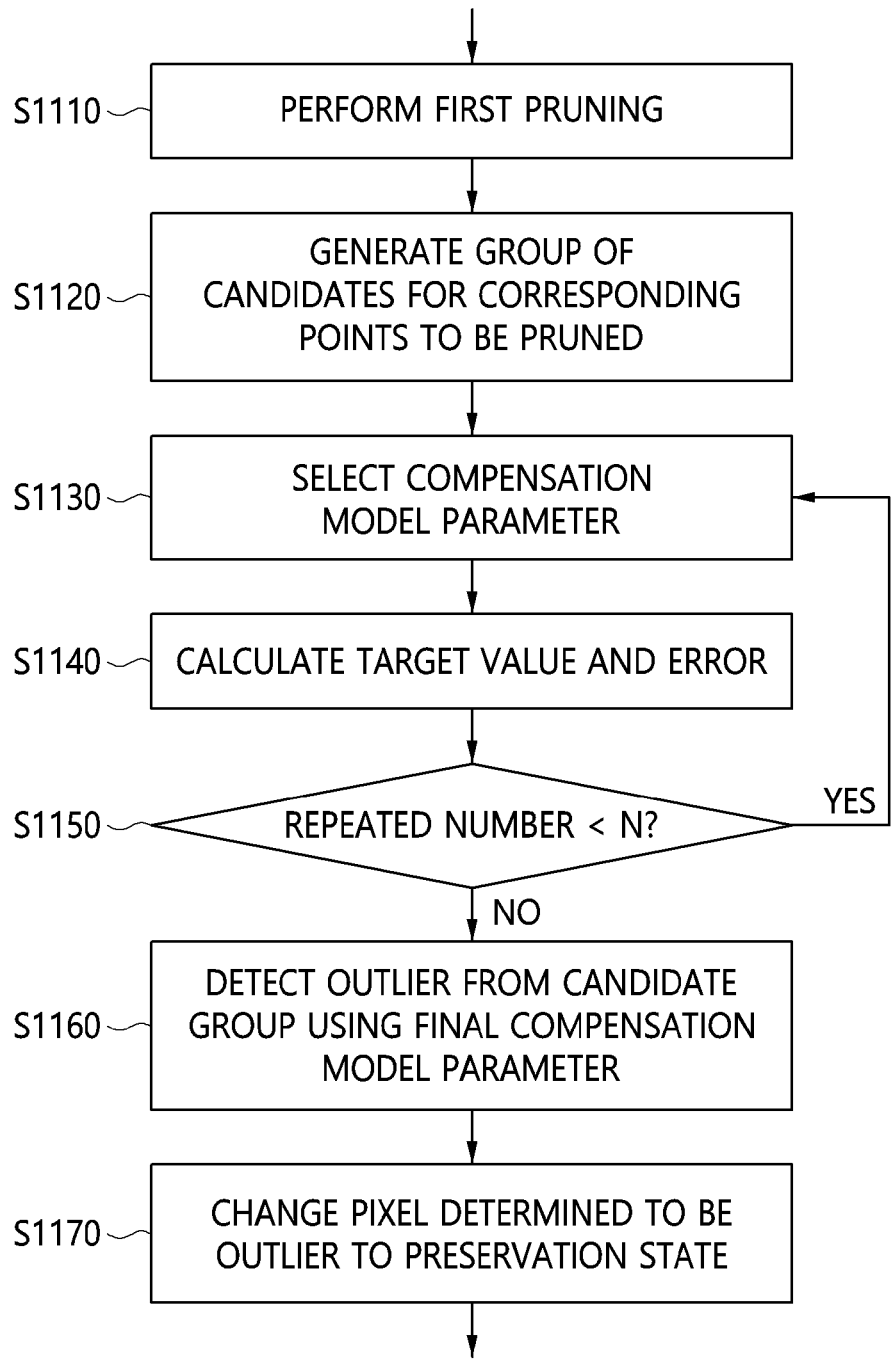
FIG. 11A is a flowchart of a method for estimating a color relationship for all pixels included in a pruning candidate group, rather than for randomly extracted samples, according to another embodiment.

As another embodiment, FIG. 11A is a flowchart of a method for estimating a color relationship for all pixels included in a pruning candidate group, rather than randomly extracted samples.

Referring to FIG. 11A, the method for generating a residual image of multi-view video according to another embodiment is configured to perform first pruning at step S1110 and to group candidates for corresponding points, which are determined through the first pruning, at step S1120.

Figure 11B:
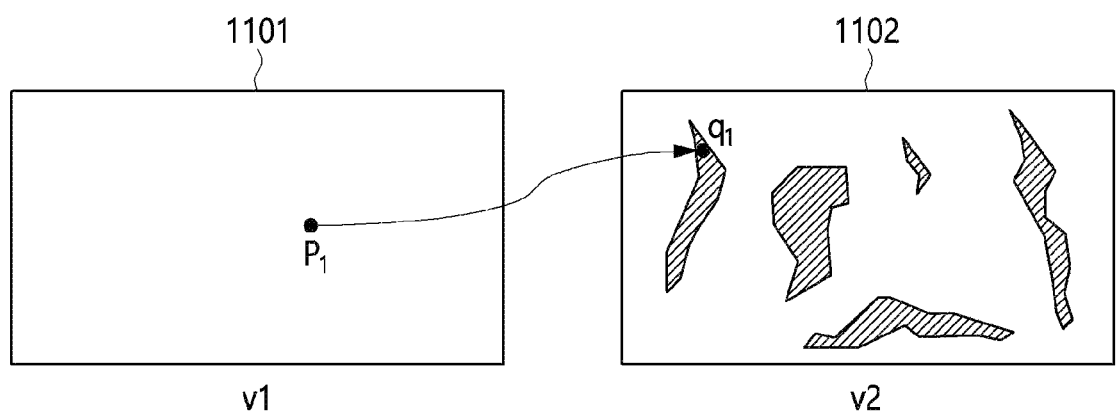
FIG. 11B is a view for explaining a method for generating group of candidates for corresponding points to be pruned.

FIG. 11B is a view for explaining a method for generating group of candidates for corresponding points to be pruned. In order to determine an overlapping pixel between a first view image 1101 and a second view image 1102, all pixels in the first view image 1101 are compared with pixel values or depth values at the locations to which the pixels are mapped by 3D view warping of the first view image 1101 to the second view image 1102 using the depth values of the respective pixels. Here, the pixels that are determined to be corresponding points in the mapped area through the first process for determining overlapping pixels are marked with diagonal lines in FIG. 11B as candidates. The pixels included in the area marked with diagonal lines are candidates for the corresponding points that are first determined through the first pruning, and because the first view image 1101 is the parent node of the second view image 1102, the pixels of the second view image 1102 that are included in the first pruning candidates are the targets to be removed (pruned).

When the candidate group is generated, all corresponding points in the pruning candidate group are extracted as samples, and the parameters of the model function f are estimated at step S1130.

Errors are calculated at step S1140 by inputting the corresponding points in the candidate group to the model function f, and this process is performed a predefined number of times N, whereby the process of repeatedly updating and thereby optimizing the parameter values of the model function f is performed at step S1150.

When the parameters of the final model function f are calculated, outliers are detected using the parameters at step S1160.

Here, the corresponding points that are classified as outliers are excluded from the pruning candidates and regarded as pixels that are not overlapping because it is determined based on the previously calculated model function f that they do not have a correspondence relationship therebetween, and thus the pixels are changed to a preservation state at step S1170.

The first pruning result may include an erroneous determination due to noise because only the pixel value and the depth value of each pixel are compared with those of a pixel corresponding thereto. In order to compensate therefor, the step of validating the first determined corresponding points is performed as a second pruning process.

When the first pruning is performed, pixels in the first view image 1101 are mapped to the second view image 1102 by warping the same, in which case the value of the mapped pixel and the value of the original pixel of the second view image 1102 may be different.

As described above, even though two pixels having a correspondence relationship therebetween are correct corresponding points, the intensity of the color component(s) thereof may differ due to variation in illumination depending on a view position, the method of acquiring a view image using a camera, image noise, and the like.

Accordingly, the textures of the two points, which correctly correspond to each other, may have similar values within a certain range, rather than being the same as each other. In consideration of the dominant color difference caused by various environmental factors, the relationship between the corresponding points of the two view images 1101 and 1102 may be characterized by a specific function f, like Equation (1) above. Based thereon, the relation between pixels in the corresponding point candidate group may be represented in the form of Ax=b, as shown in Equation (3) below:

$$\begin{pmatrix} p_{00} & \cdots & p_{0n} \\ \vdots & \ddots & \vdots \\ p_{m0} & \cdots & p_{mn} \end{pmatrix} \begin{pmatrix} f_{00} & \cdots & f_{0k} \\ \vdots & \ddots & \vdots \\ f_{nk} & \cdots & f_{nk} \end{pmatrix} = \begin{pmatrix} q_{00} & \cdots & q_{0n} \\ \vdots & \ddots & \vdots \\ q_{m0} & \cdots & q_{mn} \end{pmatrix} \quad (3)$$

where p denotes the values of the pixels in the mapped area, obtained by warping the first view image 1101 to the second view image 1102, q denotes the values of the original pixels of the second view image 1102, and f denotes parameters for color compensation between the two pixel values.

Here, f is x satisfying the linear relationship in the form of Ax=b, and may be calculated using a least square method. The least square method is widely known as one of methods for solving a linear equation, and in order to approach a solution that is closest to a target value, a process may be repeatedly performed, like the process of steps S1130 to S1150 of FIG. 11. The final model parameters are calculated through such a repeated process. Here, the compensation parameter between the corresponding pixels of the first view image 1101 and the second view image 1102 may alternatively follow a nonlinear relationship, in which case it may be calculated using a nonlinear-curve-fitting method or a deep-learning method.

The calculated final model parameters are compensation parameters representing the relationship between the corresponding points of the first view image 1101 and the second view image 1102, and a pruning mask VT is generated by applying the parameters to p of the first view image 1101. When the difference between V2' and V2 has a value equal to or greater than a threshold, the pixel is determined to be an outlier. Because the pixel determined to be an outlier is not a corresponding point, it is excluded from the candidates for the corresponding points, which are classified in the first pruning process, and is changed to a preservation state. That is, the pixel is not removed (pruned).

Here, if the final model parameter f approximately represents the compensation relationship between p of the first view image 1101 and q of the second view image 1102, f is transmitted to a decoder as metadata and is used when the above-described view reconstruction unit (802) of FIG. 8 performs reconstruction, whereby reconstruction accuracy in the un-pruning process may be improved, as shown in Equation (4) below:

$$V_2' = f(V_1) \quad (4)$$

Here, $V_1$ is a view image corresponding to the parent node of $V_2$, and because the pixel determined to overlap between the first view image and the second view image is removed from the second view image through pruning, when the compensation equation f is applied to the pixel of $V_1$ in the view reconstruction process performed by the decoder, $V_2'$ that is more similar to the original view image $V_2$ may be reconstructed.

Figure 12A:
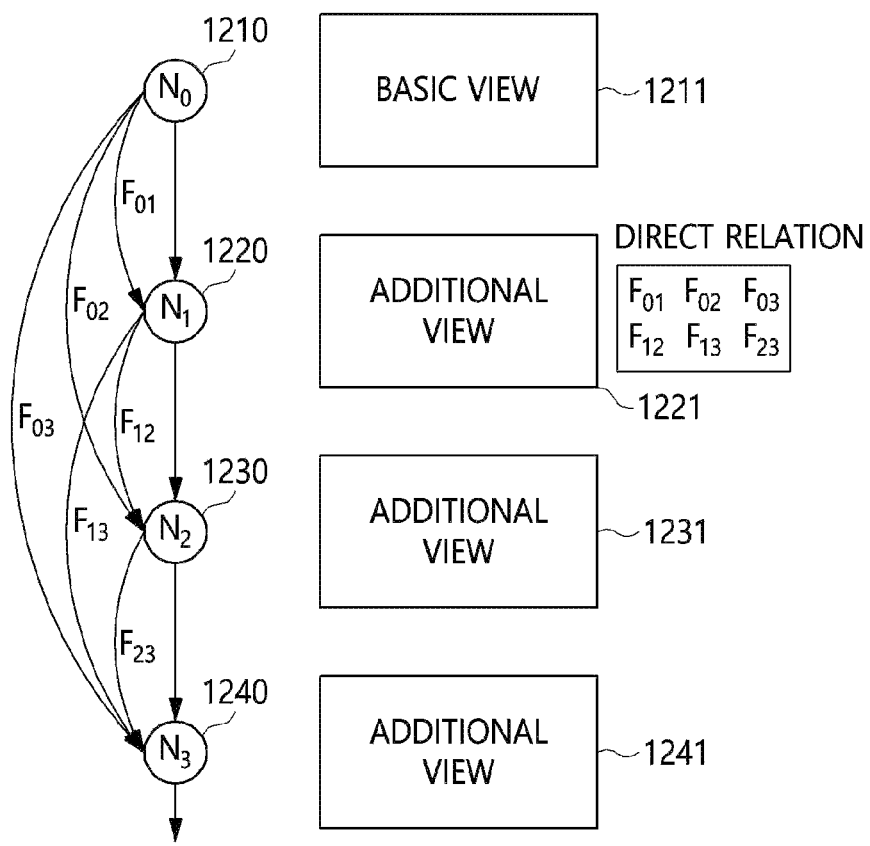
FIGS. 12A and 12B are block diagrams illustrating respective nodes connected in pairs in a pruning graph.
Figure 12B:
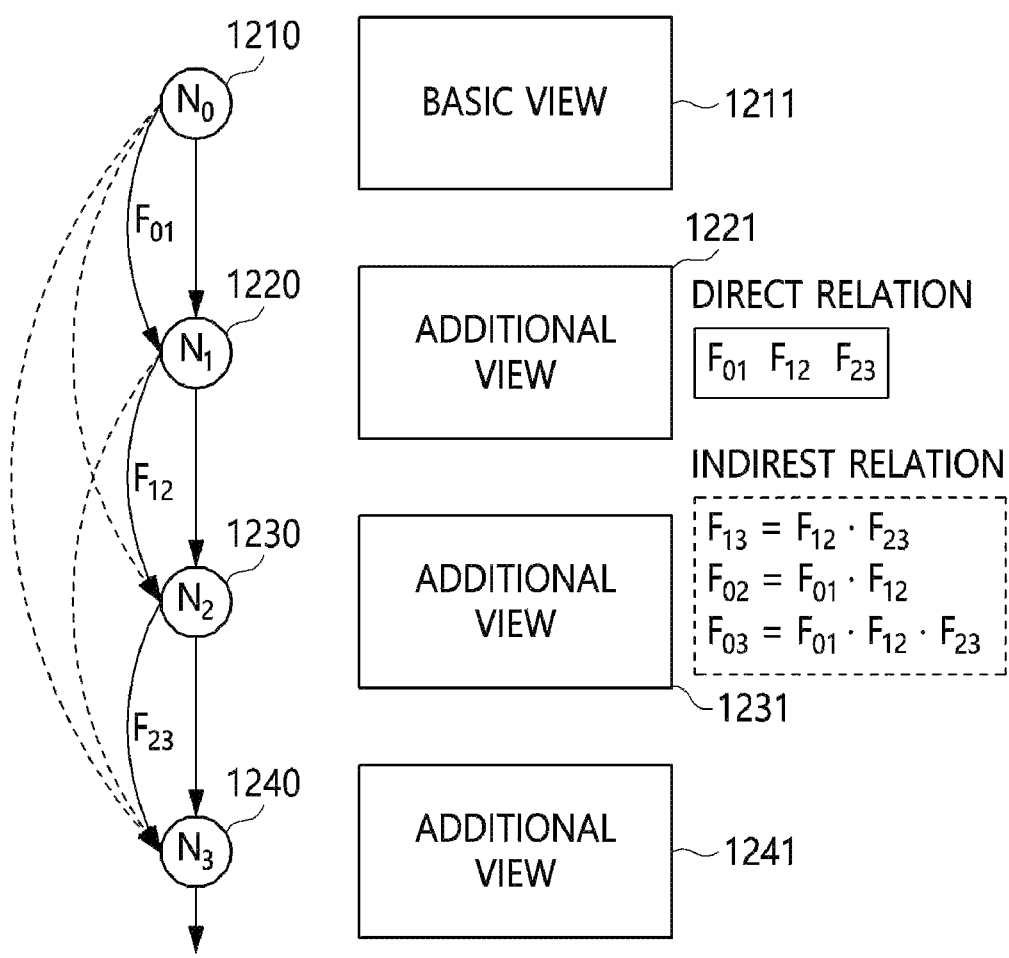

FIG. 12A and FIG. 12B are block diagrams illustrating respective nodes connected in pairs in a pruning graph.

Referring to FIG. 12A, it can be seen that each superior node is directly connected to all descendent nodes thereof in pairs, whereby a total of six compensation model parameters $F_{xy}$ are calculated.

Here, the process of calculating F may have high time complexity because a linear or nonlinear relationship between two groups configured with corresponding pixels is calculated.

In contrast, referring to FIG. 12B, it can be seen that a compensation model parameter F of a direct relation is calculated only for a pair of a parent node and a direct child node thereof.

Also, the compensation model parameters for the remaining relations may be estimated through a combination of the compensation model parameters F of the direct relations. As shown in the drawing, $F_{01}$, $F_{12}$ and $F_{23}$ are compensation model parameters between a parent node and a direct child node thereof, which can be directly connected to each other, and $F_{13}$, $F_{02}$ and $F_{03}$ may be estimated through the combinations thereof.

The process of calculating compensation model parameters is reduced using such indirect relations, whereby the time complexity of a pruning process may be reduced. Also, when compensation model parameters calculated in an encoder are transmitted to a decoder, only compensation model parameters corresponding to direct relations are transmitted, and the decoder estimates the remaining compensation model parameters by combining the received compensation model parameters, whereby the size of metadata may be reduced.

Generally, the process of calculating a compensation model parameter in the pruning process has to be performed for each frame. Here, if the compensation model parameter calculated for each frame is transmitted as metadata, the amount of data to be transmitted increases. Therefore, rather than calculating a compensation model parameter for each frame, one or more representative compensation model parameters are calculated for each intra-period (unit time), whereby the size of metadata may be reduced.

Figure 13:
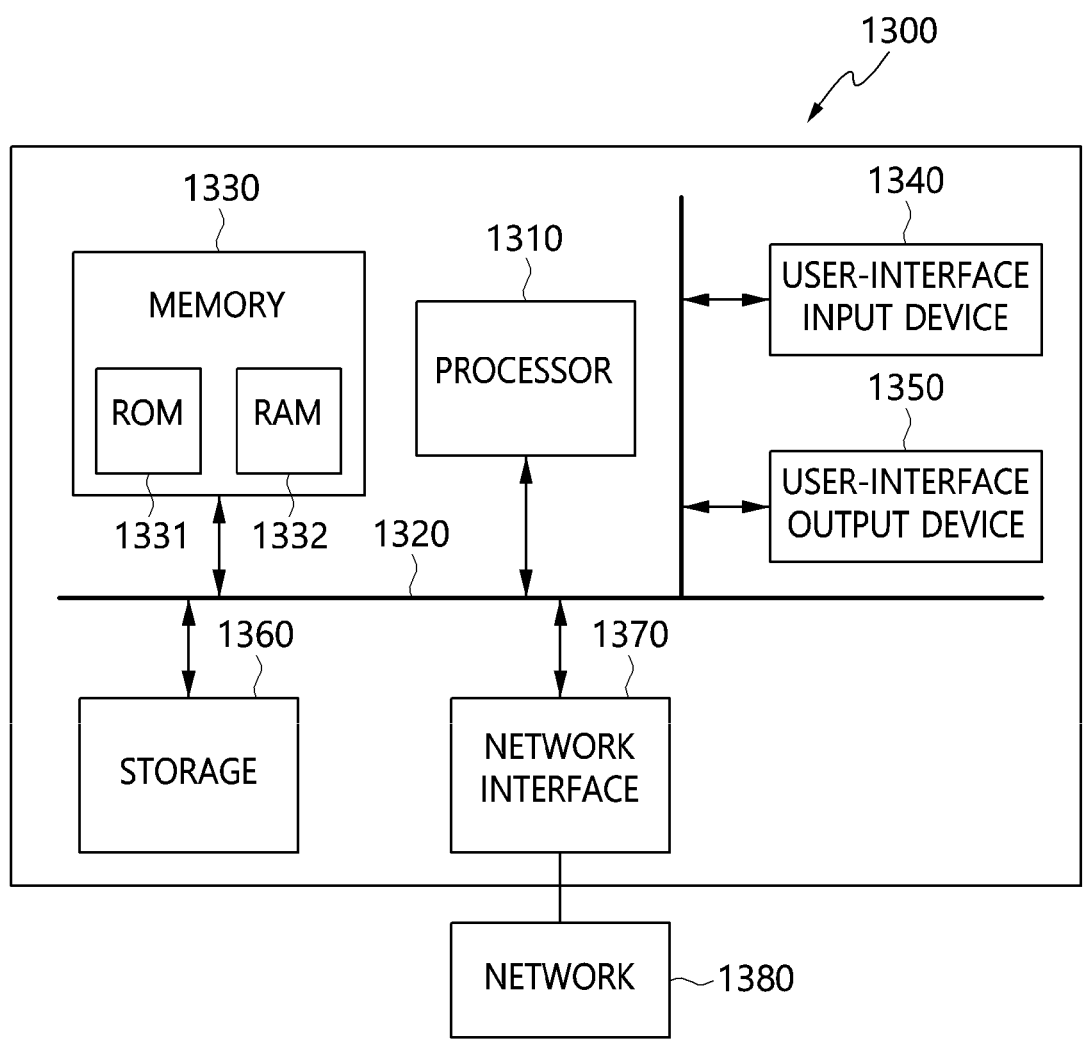
FIG. 13 is a view illustrating a computer system configuration according to an embodiment.

FIG. 13 is a view illustrating a computer system configuration according to an embodiment.

The apparatus for generating a residual image of multi-view video according to an embodiment may be implemented in a computer system 1300 including a computer-readable recording medium.

The computer system 1300 may include one or more processors 1310, memory 1330, a user-interface input device 1340, a user-interface output device 1350, and storage 1360, which communicate with each other via a bus 1320. Also, the computer system 1300 may further include a network interface 1370 connected with a network 1380. The processor 1310 may be a central processing unit or a semiconductor device for executing a program or processing instructions stored in the memory 1330 or the storage 1360. The memory 1330 and the storage 1360 may be storage media including at least one of a volatile medium, a nonvolatile medium, a detachable medium, a non-detachable medium, a communication medium, and an information delivery medium. For example, the memory 1330 may include ROM 1331 or RAM 1332.

According to the embodiment described above, overlapping pixels in multi-view video are removed, whereby data may be efficiently managed.

According to the disclosed embodiment, there may be provided a method for efficiently processing image data, the size of which increases with the increasing number of reference view images, when multiple reference view images are used.

According to the disclosed embodiment, the reliability of pruning may be improved using not only depth values but also color information in a pruning process for removing an overlapping area between reference view images.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A method for generating a residual image of multiple-view video, comprising:
    generating a pruning mask of an additional view image by mapping a basic view image to the additional view image, among multi-view images; and
    revalidating the pruning mask using color information of the basic view image and the additional view image,
    wherein revalidating the pruning mask comprises:
        defining a color relationship between the basic view image and the additional view image by extracting corresponding pixels of the basic view image and the additional view image, which correspond to pruning candidates of the pruning mask; and
        detecting pixels that do not match the color relationship, among pixels of the pruning mask, as outliers.

2. The method of claim 1, wherein generating the pruning mask comprises:
    generating a pruning graph based on information about relationships between the multi-view images.

3. The method of claim 1, further comprising:
    generating patches based on the pruning mask in which the outliers are updated to be preserved.

4. The method of claim 3, further comprising:
    packing the patches in units of atlases.

5. The method of claim 1, wherein the color relationship is defined using a least square method for the corresponding pixels.

6. The method of claim 1, wherein the color relationship is defined using all pixels corresponding to the pruning candidates of the pruning mask.

7. The method of claim 2, wherein the color relationship is defined only between images having a direct relation therebetween in the pruning graph.

8. The method of claim 7, wherein a color relationship between images having an indirect relation therebetween is estimated using the color relationship between the images having the direct relation therebetween.

9. The method of claim 1, wherein defining the color relationship is configured to define a representative color relationship between the basic view image and the additional view image at regular intervals.

10. An apparatus for generating a residual image of multiple-view video, comprising:
    a first pruning unit for generating a pruning mask of an additional view image by mapping a basic view image to the additional view image, among multi-view images; and
    a second pruning unit for revalidating the pruning mask using color information of the basic view image and the additional view image,
    wherein the second pruning unit defines a color relationship between the basic view image and the additional view image by extracting corresponding pixels of the basic view image and the additional view image, which correspond to pruning candidates of the pruning mask, and detects pixels that do not match the color relationship, among pixels of the pruning mask, as outliers.

11. The apparatus of claim 10, wherein the first pruning unit generates a pruning graph based on information about relationships between the multi-view images.

12. The apparatus of claim 10, further comprising:
    a patch generation unit for generating patches based on the pruning mask in which the outliers are updated to be preserved.

13. The apparatus of claim 12, further comprising:
    a packing unit for packing the patches in units of atlases.

14. The apparatus of claim 10, wherein the color relationship is defined using a least square method for the corresponding pixels.

15. The apparatus of claim 10, wherein the second pruning unit defines the color relationship using all pixels corresponding to the pruning candidates of the pruning mask.

16. The apparatus of claim 11, wherein the second pruning unit defines a color relationship only between images having a direct relation therebetween in the pruning graph.

17. The apparatus of claim 16, wherein a color relationship between images having an indirect relation therebetween is estimated using the color relationship between the images having the direct relation therebetween.

18. The apparatus of claim 10, wherein the second pruning unit defines a representative color relationship between the basic view image and the additional view image at regular intervals.

* * * * *